United States Patent [19]

Wernicke et al.

[11] Patent Number: 4,680,123

[45] Date of Patent: Jul. 14, 1987

[54] REGENERATION OF SPENT DEVELOPERS

[75] Inventors: Ubbo Wernicke, Cologne; Heinz Meckl, Bergisch Gladbach; Hans-Günter Donner, Odenthal; Jürgen Frosch, Leverkusen, all of Fed. Rep. of Germany

[73] Assignee: Agfa Gevaert Aktiengesellschaft, Leverkusen, Fed. Rep. of Germany

[21] Appl. No.: 781,763

[22] Filed: Sep. 30, 1985

[30] Foreign Application Priority Data

Oct. 13, 1984 [DE] Fed. Rep. of Germany ....... 3437631

[51] Int. Cl.[4] .............................................. B01D 15/04

[52] U.S. Cl. ..................................... 210/683; 430/399

[58] Field of Search ............................... 210/683-686, 210/692; 430/399

[56] References Cited

U.S. PATENT DOCUMENTS

| | | | |
|---|---|---|---|
| 3,253,920 | 5/1966 | Rees et al. | 430/399 |
| 3,869,383 | 3/1975 | Shimamura et al. | 430/399 |
| 3,931,004 | 1/1976 | Shimamura et al. | 210/684 |
| 4,043,907 | 8/1977 | Shimamura et al. | 430/399 |
| 4,163,023 | 7/1979 | Endo et al. | 430/399 |

FOREIGN PATENT DOCUMENTS

| | | | |
|---|---|---|---|
| 53-96831 | 8/1978 | Japan | 430/399 |

*Primary Examiner*—Ivars Cintins

*Attorney, Agent, or Firm*—Connolly and Hutz

[57] ABSTRACT

Anion exchangers containing OH groups as exchange active groups are suitable for the regeneration of photographic developers.

4 Claims, No Drawings

REGENERATION OF SPENT DEVELOPERS

This invention relates to a process for the regeneration of spent developers which have been used for the development of photographic materials containing at least one silver halide emulsion layer.

For regenerating spent photographic developer baths, the substances used up in these baths or carried out of the baths in the course of processing photographic materials must be replaced. It is not sufficient, however, to replace the volume of solution lost and add the spent substances (e.g. developer substance) but in addition the bromide and iodide ions released during development of the photographic material must be removed from the developer. Otherwise, the bromide ion and iodide ion concentration would continuously increase with repeated regeneration of the developer and the developer would become unusable.

It is already known to remove bromide and iodide ions from solutions by means of strongly basic anion exchangers, normally by displacing the absorbed bromide and iodide with the chloride ions of a NaCl solution. Such regenerated ion exchangers can be used again for regenerating developers. When a developer is regenerated with such an ion exchanger, the ion exchanger absorbs bromide and iodide ions from the developer and desorbs chloride in exchange for the bromide or iodide. Chloride has a less harmful effect on the development process than bromide or iodide. However, the chloride concentration in the developer rises to such an extent after repeated regeneration that the sensitometric results are significantly affected until the developer may finally become unusable.

It is also known to treat the ion exchanger with a bicarbonate solution after regeneration of the ion exchanger with chloride solution. In that case, bicarbonate groups appear at the exchange-active areas of the ion exchanger. When an ion exchanger which has been treated in this way is used again for the regeneration of spent developers, the bromide and iodide ions adsorbed from the solution are not replaced by chloride ions but by bicarbonate ions. One disadvantage of this is that the bicarbonate ions which go into solution lower the pH and additional chemicals are then necessary to maintain the required pH.

It is an object of the present invention to provide a process for the regeneration of developer in which the bromide and iodide ions can be removed to a large extent without the undesirable accumulation of other consituents in the regenerated developer.

A process for the regeneration of spent photographic developers has now been found, in which unwanted substances are removed with an anion exchanger. According to the invention, the anion exchanger contains OH groups as exchangeable groups.

The anion exchangers used are preferably strongly basic, in particular exchangers based on polystyrene, polystyrene/divinylbenzene, or polyacrylate. The exchangeable groups in such exchangers consist predominantly or completely of OH groups.

In a preferred embodiment, at least 90% of the exchangeable groups are OH groups.

It has further been found that certain substances, hereinafter referred to as adsorbents, such as adsorption resins, active charcoal, surface modified active charcoal and Fuller's earth, ensure that the anion exchanger used for removing the bromide and iodide ions will be capable of regenerating and of exchanging bromide and iodide ions if the spent colour developer is first passed through the adsorbent and only then through the anion exchanger or through a mixture of ion exchanger and adsorbent. It is found that the developer substances are held back to differing extents by different adsorbents. Adsorption resins of the type of phenol formaldehyde-, polystyrene/divinylbenzene or polyacrylate resins containing hydroxyl groups, alkylatd amino groups or quaternary ammonium groups as functional groups constitute suitable adsorbents. A cation exchanger capable of removing heavy metal ions from the solution of spent colour developer may be used in addition.

The developer may be regenerated by various methods. For example, the overflow of developer brought about by the addition of replenishing chemicals during processing of the photographic material can be collected and first passed through the anion exchanger and then through the adsorbent, or first through the adsorbent and then through the anion exchanger, or through a mixture of adsorbent and anion exchanger, or only through the anion exchanger from above downwards, or from the bottom upwards. The spent developer flowing through the exchange may then be collected and mixed with the regenerating chemicals, also known as "regenerator" (German: "Rejuvenator") and used as replenisher (German: "Regenerator").

After a certain quantity of colour developer has passed through, the anion exchanger to be used according to the invention is exhausted. It may then be regenerated or, alternatively, fresh anion exchanger may be used whenever the old exchanger is exhausted. Apart from the saving in expense and effort, in particular the expense in machinery required for regenerating the ion exchanger, the use of fresh ion exchanger has the advantage that a fresh exchanger is more active than a regenerated ion exchanger. Moreover, when fresh ion exchanger is used each time, less waste is produced than in the regeneration of an ion exchanger, the waste being virtually limited to the comparatively small volume of spent ion exchanger whereas regeneration of an ion exchanger results in a comparatively large volume or rinsing eluate which must be eliminated as waste.

The process according to the invention is suitable in principle for regenerating any photographic developer. The developer bath may contain black-and-white developer substances, e.g. hydroquinone, or colour developer substances, such as the known p-phenylenediamines, in particular those corresponding to the following general formula:

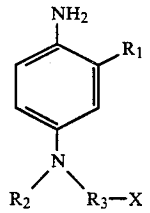

wherein $R_1$=H, alkyl, alkoxy, NH—$SO_2$—R $R_2$=alkyl $R_3$=alkyl

X=H, OH, alkoxy, $SO_3H$ or NH—$SO_2$—$R_2$.

The developer baths which are to be regenerated may also contain the usual developer components such as antioxidants, water softeners, antifogging agents, buffers, competing couplers, etc.

EXAMPLE 1

(invention)

A commercial colour photographic multilayered material on a support of PE-laminated paper is exposed imagewise and subjected to the following process:

| Bath | time | °C. |
|---|---|---|
| Developer bath | 3.5 minutes | 33 |
| Bleach fixing bath | 1.5 minutes | 33 |
| Washing | 3.5 minutes | 30 |

The replenishment rate for the developer amounted to 325 ml/$m^2$ of recording material.

The developer overflow had the composition shown in Table 1. 40 l of the overflow were worked up according to the invention by treatment with 500 ml of a ion exchanger of the polystyrene/divinylbenzene type with OH groups to be used according to the invention (Lewatit ®M 500-KR-OH) and 500 ml of adsorbent of the polystyrene/divinylbenzene type (Lewatit ®MP 500 A).

After passing through the ion exchanger and the adsorbent, the overflow had the composition indicated in the middle column of Table 1. The bromide was removed virtually quantitatively and the pH rose without any increase in the chloride ion concentration. The compounds entered in Table I were added in the quantities per liter shown in the right hand column of the Table to the overflow which had been treated as described above, and a replenisher ready for use was obtained. This replenisher had a pH of 10.6 and could be directly added to the developer bath.

TABLE 1

| Compound | Overflow | Purified overflow | Quantity added |
|---|---|---|---|
| Benzyl alcohol | 13.5 ml | 13.1 ml | 4.9 ml |
| Hydroxyl ammonium sulphate | 3.4 g | 3.3 g | 0.7 g |
| Sodium sulphite | 1.8 g | 1.7 g | 0.5 g |
| 4-Amino-N—ethyl-N(β-methanesulphonamido-ethyl)-m-toluidine sesquisulphate (monohydrate) | 5.0 g | 4.6 g | 2.0 g |
| Potassium carbonate | 36.0 g | 36.0 g | — |
| Potassium bromide | 0.7 g | — | — |
| Diethylene-triamino-pentacetic acid penta-sodium salt | 0.5 g | 0.5 g | — |
| Sodium chloride | 0.6 g | 0.6 g | — |
| Potassium hydroxide | — | — | 1.0 g |
| | pH 10.4 | pH 10.5 | |

After addition of the replacement chemicals to the purified overflow, the replenisher has the required pH 10.6 and is ready for use.

40 l of overflow were purified by this method and returned to the developer. The sensitometric results obtained were excellent. When 40 l of overflow had been purified in the manner described, the ion exchanger and the adsorbent were exhausted. Both were then replaced by fresh ion exchanger and fresh adsorbent. Only exhausted ion exchanger and exhausted adsorbent were produced as waste but no purification eluate.

Similar results were obtained if the following ion exchangers and optionally other adsorbents were used;

| | |
|---|---|
| Ion exchangers: | Polyacrylate matrix, strongly basic |
| Adsorbent: | Polyacrylate matrix, strongly basic |
| | Phenol formaldehyde matrix |

EXAMPLE 2

The procedure is the same as in Example 1 except that the overflow is not reused. To keep the properties of the developer constant, a fresh replenisher having the following composition per liter is added:

| | |
|---|---|
| Benzyl alcohol | 18 ml |
| Hydroxyl ammonium sulphate | 4.0 g |
| Sodium sulphite | 2.2 g |
| 4-Amino-N—ethyl-N—(β-methane-sulphonamido-ethyl)-m-toluidine sesquisulphate (monohydrate) | 6.6 g |
| Potassium carbonate | 36.0 g |
| Diethylene triaminopentacetic acid pentasodium salt | 0.7 g |
| Potassium hydroxide | 2.0 g |
| pH = 10.6. | |

When the sensitometric results were compared with those of Example 1, no difference was found.

EXAMPLE 3

(Comparison)

The material described in Example 1 was worked up as indicated there. The overflow produced had the composition indicated in that Example. It was purified by the same method except that the ion exchanger used contained Cl ions as exchangeable groups and not OH groups. The purified overflow had the following composition per liter:

| | |
|---|---|
| Benzyl alcohol | 13.1 ml |
| Hydroxyl ammonium sulphate | 3.3 g |
| Sodium sulphite | 1.7 g |
| 4-Amino-N—ethyl-N(β-methane-sulphonamido-ethyl)-m-toluidine sesquisulphate (monohydrate) | 4.0 g |
| Potassium carbonate | 36.0 g |
| Potassium bromide | — |
| Diethylene triaminopentacetic acid pentasodium salt | 0.5 g |
| Sodium chloride | 3.6 g |
| pH = 10.3 | |

The process of Example 3 had the following disadvantages compared with the process according to the invention described in Example 1:

1. the pH dropped markedly;
2. the chloride ion concentration continued to rise;
3. the loss in developer substance was found to be increased.

To prepare a replenisher ready for use as in Example 1, it is necessary to add a further quantity of potassium hydroxide in addition to the substances per liter listed in Example 1.

What is claimed is:

1. A process for the regeneration of spent photographic developers which comprises the step of treating a spent photographic developer with a strongly basic anion exchanger comprising OH-groups as exchangeable groups, sufficient to remove bromide and iodide ions from the spent photographic developer.

2. Process according to claim 1, characterised in that at least 90% of the exchangeable groups of the anion exchanger are OH groups.

3. Process according to claim 1, characterised in that the spent developer is treated with an adsorbent before the treatment with the anion exchanger.

4. Process, according to claim 1, characterised in that the anion exchanger is used in a mixture with an adsorbent.

* * * * *